(12) United States Patent
Joshi et al.

(10) Patent No.: US 7,487,642 B2
(45) Date of Patent: Feb. 10, 2009

(54) METHODS AND APPARATUS FOR OPERATING GAS TURBINE ENGINES

(75) Inventors: Narendra Digamber Joshi, Cincinnati, OH (US); David Paul Wolf, West Chester, OH (US)

(73) Assignee: General Electric Comapny, Schenectady, NY (US)

( * ) Notice: Subject to any disclaimer, the term of this patent is extended or adjusted under 35 U.S.C. 154(b) by 584 days.

(21) Appl. No.: 11/264,234

(22) Filed: Nov. 1, 2005

(65) Prior Publication Data

US 2007/0095068 A1    May 3, 2007

(51) Int. Cl.
*F02C 3/30* (2006.01)
*F02C 7/224* (2006.01)

(52) U.S. Cl. ............... 60/775; 60/39.55; 60/736

(58) Field of Classification Search ......... 60/39.182, 60/39.3, 39.53, 39.55, 39.59, 736, 775
See application file for complete search history.

(56) References Cited

U.S. PATENT DOCUMENTS

| | | | |
|---|---|---|---|
| 2,602,289 A * | 7/1952 | Anxionnaz et al. ............ 60/736 |
| 4,932,204 A * | 6/1990 | Pavel et al. ............ 60/736 |
| 6,050,082 A | 4/2000 | Leonard et al. |
| 6,195,607 B1 | 2/2001 | Rajamani et al. |
| 6,449,953 B1 | 9/2002 | Hook, Jr. et al. |
| 6,536,206 B2 | 3/2003 | Hook, Jr. et al. |
| 6,560,966 B1 * | 5/2003 | Fetescu et al. ............ 60/775 |
| 6,837,056 B2 | 1/2005 | Potnis et al. |
| 6,920,760 B2 * | 7/2005 | Schottler et al. ............ 60/736 |
| 7,284,377 B2 * | 10/2007 | Joshi et al. ............ 60/775 |

* cited by examiner

*Primary Examiner*—Louis J Casaregola
(74) *Attorney, Agent, or Firm*—William Scott Andes, Esq.; Armstrong Teasdale LLP

(57) ABSTRACT

A method for operating a gas turbine engine including a compressor, a combustor, and a turbine, coupled together in serial flow arrangement, and a fuel heating system including a heat exchanger and an economizer. The method includes channeling fuel through the heat exchanger, channeling a working fluid through the heat exchanger to facilitate regulating the operating temperature of the fuel and the operating temperature of the working fluid, and channeling the fuel and the working fluid into the gas turbine engine combustor to facilitate increasing a fuel efficiency of the gas turbine engine.

17 Claims, 4 Drawing Sheets

METHODS AND APPARATUS FOR OPERATING GAS TURBINE ENGINES

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high-pressure turbine. The high-pressure compressor, combustor and high-pressure turbine are sometimes collectively referred to as the core engine. Such gas turbine engines also may include a low-pressure compressor, or booster, for supplying compressed air to the high-pressure compressor.

Air pollution concerns worldwide have led to stricter emissions standards both domestically and internationally. Pollutant emissions from at least some gas turbines are subject to Environmental Protection Agency (EPA) standards that regulate the emission of oxides of nitrogen (NOx), unburned hydrocarbons (HC), and carbon monoxide (CO). In general, engine emissions fall into two classes: those formed because of high flame temperatures (NOx), and those formed because of low flame temperatures that do not allow the fuel-air reaction to proceed to completion (HC & CO).

Accordingly, at least one known gas turbine engine includes a water injection system that is configured to inject water into the combustor to facilitate reducing nitrous oxide emissions from the gas turbine engine by reducing the flame temperature in the combustor. However, injecting water into the combustor may also result in a significant decrease in the fuel efficiency of the gas turbine engine.

BRIEF DESCRIPTION OF THE INVENTION

In one aspect, a method for operating a gas turbine engine including a compressor, a combustor, and a turbine, coupled together in serial flow arrangement, and a fuel heating system including a heat exchanger and an economizer is provided. The method includes channeling fuel through the heat exchanger, channeling a working fluid through the heat exchanger to facilitate regulating the operating temperature of the fuel and the operating temperature of the working fluid, and channeling the fuel and the working fluid into the gas turbine engine combustor to facilitate increasing a fuel efficiency of the gas turbine engine.

In another aspect, a fuel heating system for a gas turbine engine including at least a combustor and a turbine is provided. The fuel heating system includes a heat exchanger comprising a fuel circuit having fuel flowing therethrough and a working fluid circuit having a working fluid flowing therethrough to regulate the operating temperature of the fuel flowing through the fuel circuit, the heat exchanger configured to discharge fuel from the fuel circuit into the combustor, and to discharge the working fluid from the working fluid circuit to the combustor to facilitate increasing the fuel efficiency of the gas turbine engine.

In a further aspect, a gas turbine engine assembly is provided. The gas turbine engine assembly includes a compressor, a combustor downstream from the compressor, a turbine coupled in flow communication with the combustor, and a fuel heating system. The fuel heating system includes a heat exchanger comprising a fuel circuit having fuel flowing therethrough and a working fluid circuit having a working fluid flowing therethrough to regulate the operating temperature of the fuel flowing through the fuel circuit, the heat exchanger configured to discharge fuel from the fuel circuit into the combustor, and to discharge the working fluid from the working fluid circuit to the combustor to facilitate increasing the fuel efficiency of the gas turbine engine.

DETAILED DESCRIPTION OF THE INVENTION

Figure 1:
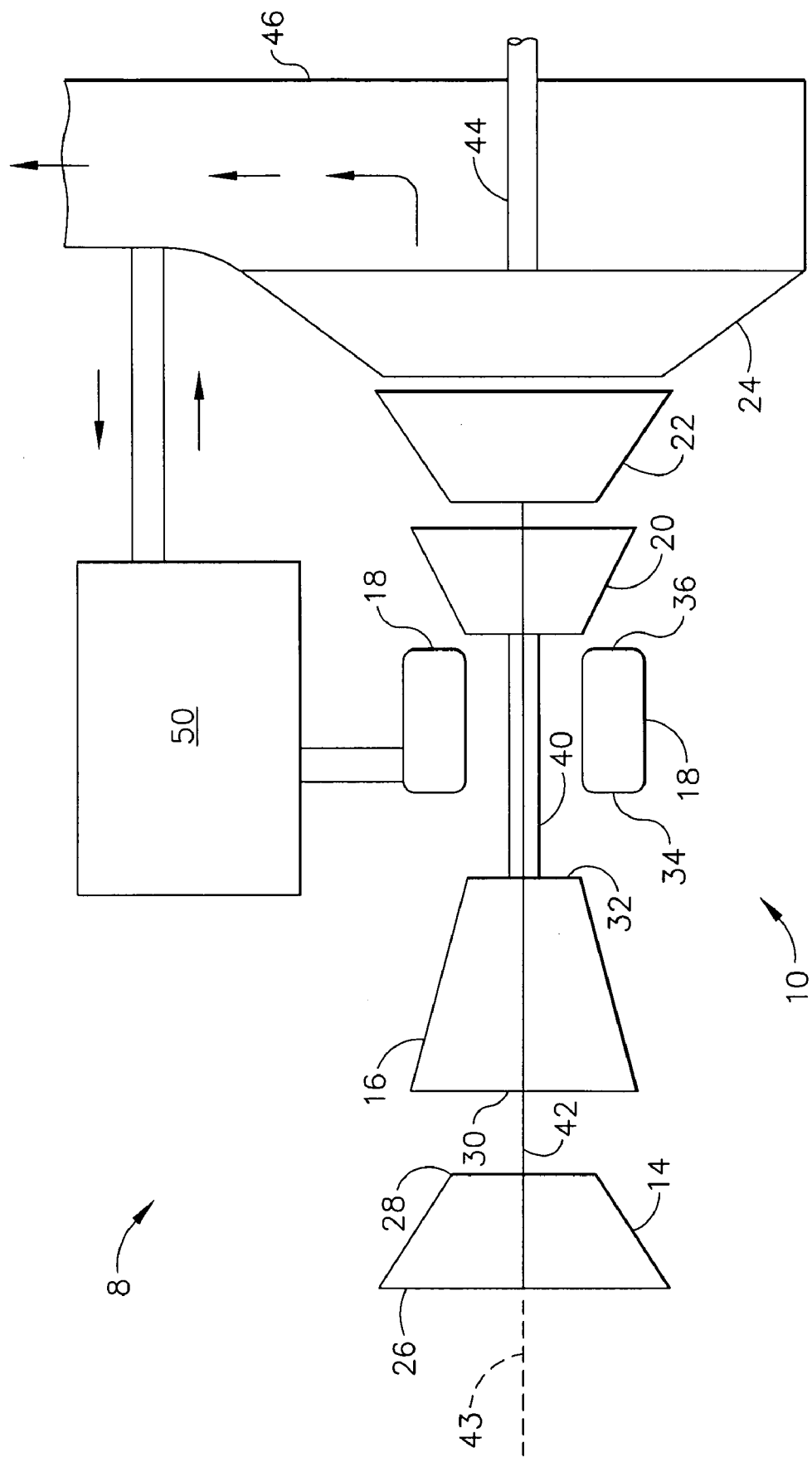
FIG. 1 is an exemplary gas turbine engine including a fuel heating system.

FIG. 1 is a block diagram of a gas turbine engine assembly 8 including a gas turbine engine 10 and a fuel heating system 50. Gas turbine engine 10 includes, in serial flow relationship, a low-pressure compressor or booster 14, a high-pressure compressor 16, a combustor 18, a high-pressure turbine 20, a low-pressure, or intermediate turbine 22, and a power turbine or free turbine 24. Low-pressure compressor or booster 14 has an inlet 26 and an outlet 28, and high-pressure compressor 16 includes an inlet 30 and an outlet 32. Combustor 18 has an inlet 34 that is substantially coincident with high-pressure compressor outlet 32, and an outlet 36.

High-pressure turbine 20 is coupled to high-pressure compressor 16 with a first rotor shaft 40, and low-pressure turbine 22 is coupled to low-pressure compressor 14 with a second rotor shaft 42. Rotor shafts 40 and 42 are each substantially coaxially aligned with respect to a longitudinal centerline axis 43 of engine 10. Engine 10 may be used to drive a load, not shown, which may be coupled to a power turbine shaft 44. Optionally, the load may be coupled to a forward extension, not shown, of rotor shaft 42.

In operation, ambient air, drawn into low-pressure compressor inlet 26, is compressed and channeled downstream to high-pressure compressor 16. High-pressure compressor 16 further compresses the air and delivers high-pressure air to combustor 18 where it is mixed with fuel, and the mixture is ignited to generate high temperature combustion gases. The combustion gases are channeled from combustor 18 to drive turbines 20, 22, and 24, and then channeled through an exhaust duct 46 to ambient.

Figure 2:
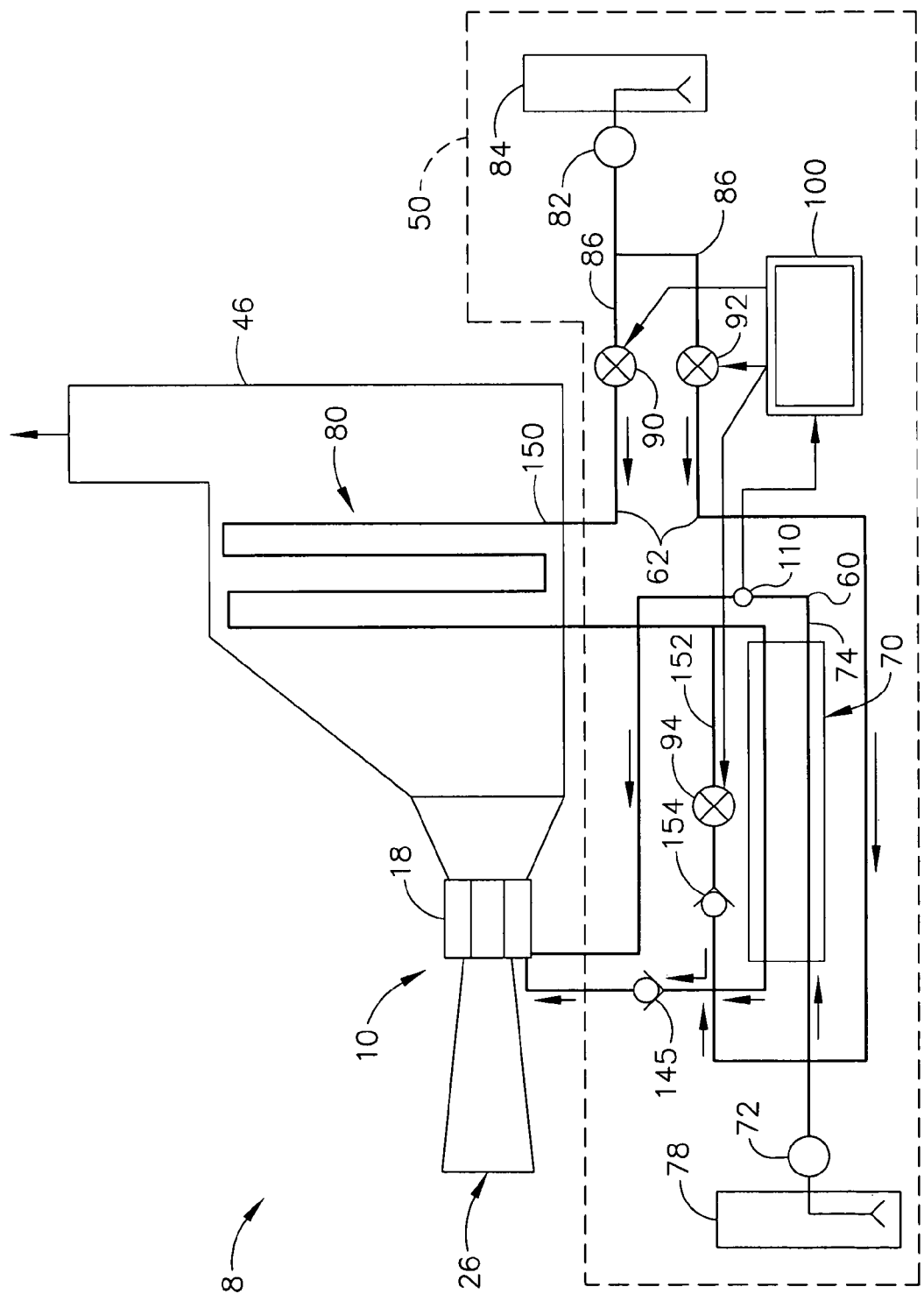
FIG. 2 is a block diagram of the exemplary fuel heating system in FIG. 1.

FIG. 2 is a block diagram of the exemplary fuel heating system 50 shown in FIG. 1. The fuel efficiency of engine 10 is at least partially related to the temperature of the fuel injected into gas turbine engine combustor 18. Accordingly, increasing a temperature of the fuel entering combustor 18 generally results in increasing the overall efficiency of gas turbine engine 10. To facilitate increasing the operational temperature of the fuel entering combustor 18, fuel heating system 50 includes a first or primary heating system 60 and a second or secondary heating system 62. Primary heating system 60 includes a heat exchanger 70 and a pump 72. Primary heating system 60 is operated in a substantially open-loop configuration and includes a fuel 74 flowing therethrough that is channeled to combustor 18 and utilized in the combustion process. In the exemplary embodiment, primary heating system 60 also includes a tank or reservoir 78 to facilitate storing fuel 74.

Secondary heating system 62 includes a heat exchanger or economizer 80, a pump 82, and a tank or reservoir 84 to facilitate storing a working fluid 86 and to facilitate adding additional working fluid 86 to secondary heating system 62 as desired. In the exemplary embodiment, working fluid 86 is demineralized water that is stored within tank 84 and channeled to combustor 18 to facilitate reducing nitrous oxide emissions from gas turbine engine 10. In the exemplary embodiment, secondary heating system 62 is operated in a substantially open-loop configuration and includes an economizer inlet valve 90, an economizer bypass valve 92, and a fuel heat exchanger bypass valve 94.

Fuel heating system 50 also includes a control system 100 that is configured to control the operation of fuel heating system 50. More specifically, and in the exemplary embodiment, control system 100 includes a temperature sensor 110 that is coupled to primary heating system 60. More specifically, temperature sensor 110 is configured to sense the temperature of fuel 74 that is discharged from heat exchanger 70 and channeled to combustor 18. In the exemplary embodiment, control system 100 is also electrically coupled to economizer inlet valve 90, economizer bypass valve 92, and fuel heat exchanger bypass valve 94, respectively. More specifically, control system 100 is configured to open/close economizer inlet valve 90, an economizer bypass valve 92, and a fuel heat exchanger bypass valve 94 based on inputs received from temperature sensor 110, or optionally, inputs received from an operator.

Figure 3:
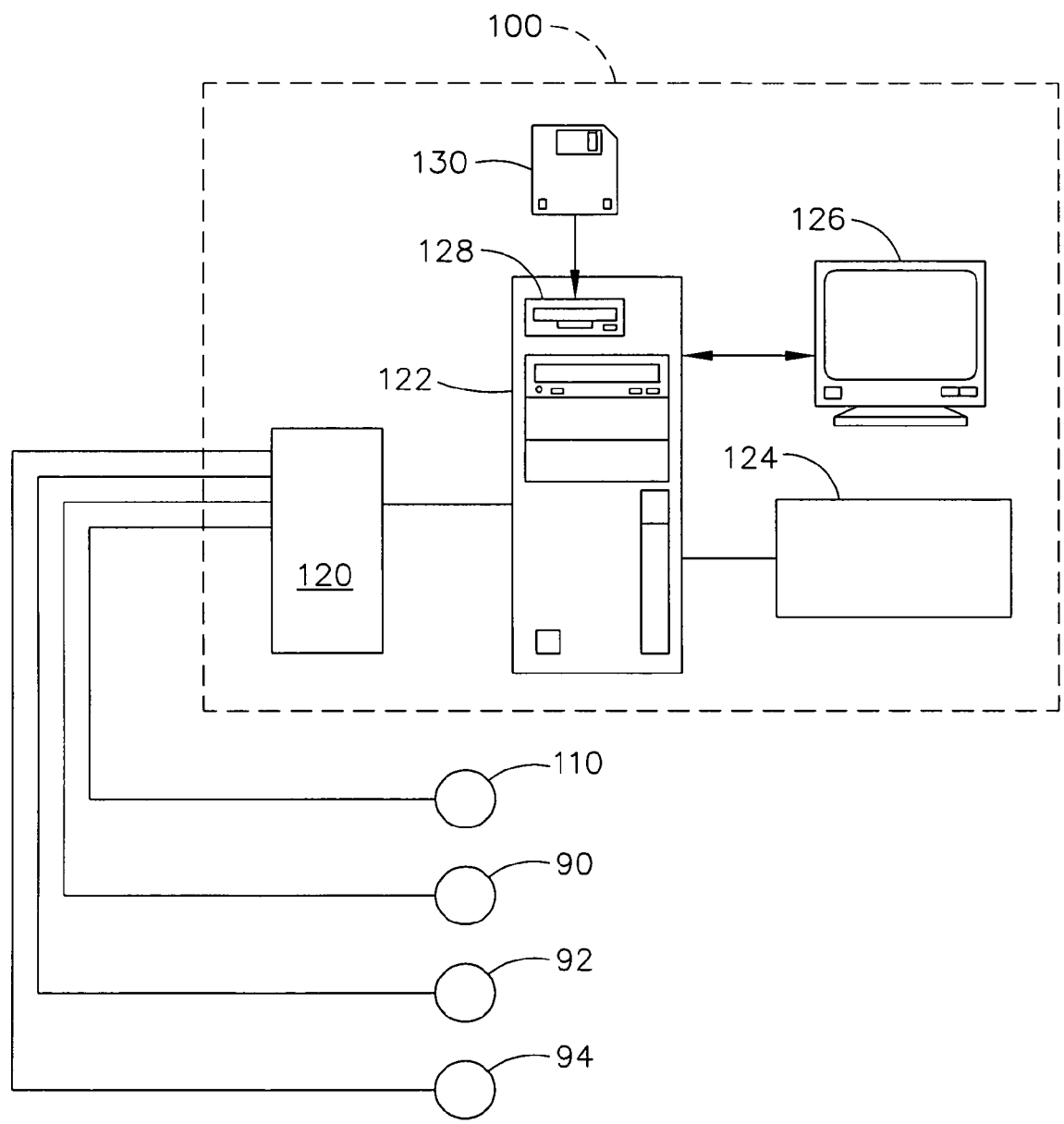
FIG. 3 is a block diagram of a portion of the fuel heating system shown in FIGS. 1 and 2.

As shown in FIG. 3, a control interface section 120 samples analog data received from temperature sensor 110, economizer inlet valve 90, economizer bypass valve 92, and fuel heat exchanger bypass valve 94. Control interface section 120 converts the analog data to digital signals for subsequent processing. A computer 122 receives the sampled and digitized sensor data from control interface section 120 and performs high-speed data analysis.

Computer 122 receives commands from an operator via a keyboard 124. An associated monitor 126 such as, but not limited to, a liquid crystal display (LCD) and/or a cathode ray tube, allows the operator to observe data received from computer 122. The operator supplied commands and parameters are used by computer 122 to provide control signals and information to control interface section 120.

In one embodiment, computer 122 includes a device 128, for example, a floppy disk drive, CD-ROM drive, DVD drive, magnetic optical disk (MOD) device, and/or any other digital device including a network connecting device such as an Ethernet device for reading instructions and/or data from a computer readable medium 130, such as a floppy disk, a CD-ROM, a DVD or an other digital source such as a network or the Internet, as well as yet to be developed digital means. In another embodiment, computer 122 executes instructions stored in firmware (not shown). Computer 122 is programmed to perform the functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

Figure 4:
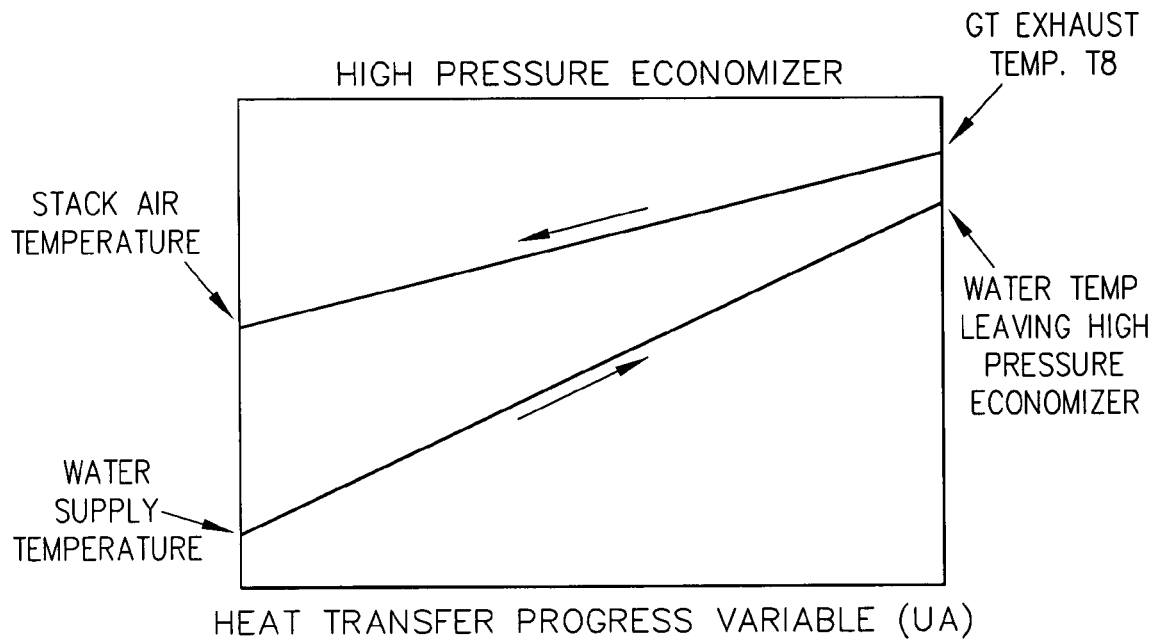
FIG. 4 is a graphical illustration of the high-pressure economizer shown in FIG. 2 during normal operation.
Figure 5:
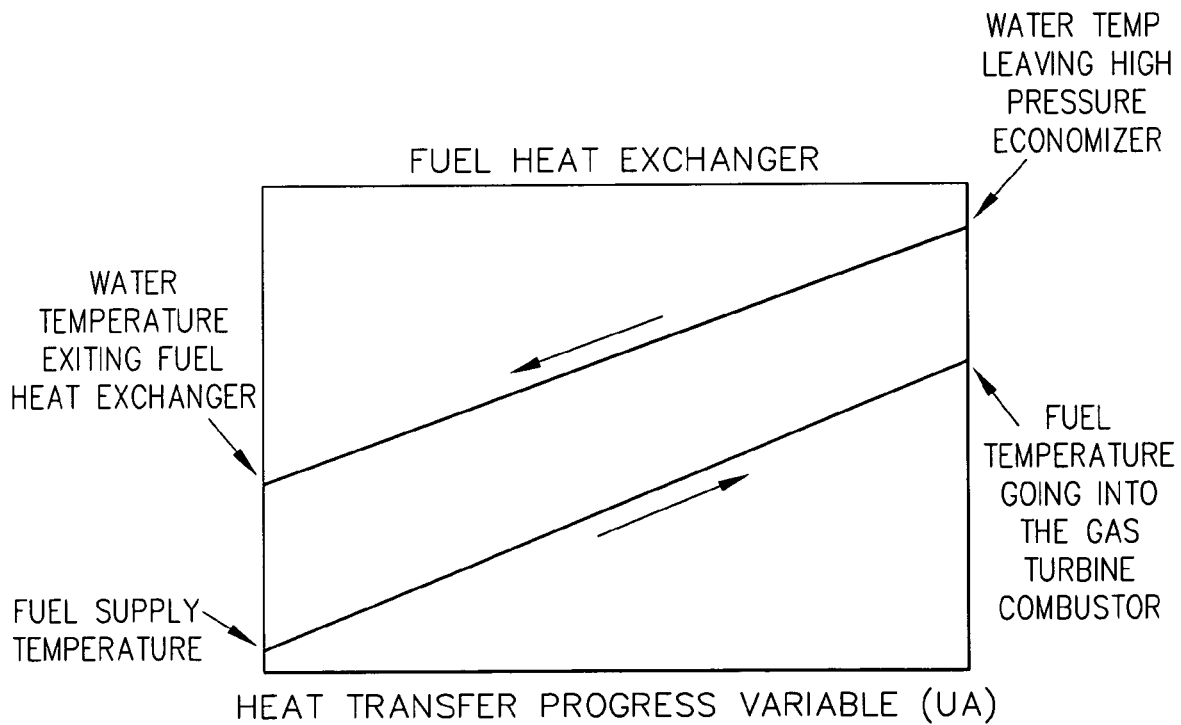
FIG. 5 is a graphical illustration of the heat exchanger shown in FIG. 2 during normal operation

FIGS. 4 and 5 are graphical illustrations of fuel heating system 50 during normal operation. In the exemplary embodiment, pump 72 is activated such that fuel 74, at a first temperature, is channeled through heat exchanger 70, and then into combustor 18. Control system 100 then receives an input from temperature sensor 110 indicative of the temperature of fuel 74 entering combustor 18. An operator enters a preselected fuel temperature into control system 100 utilizing keyboard 124, for example. For example, the operator may enter a fuel temperature of 120 degrees. System 50 is then operated by control system 100 to facilitate either increasing or decreasing the temperature of fuel 74, such that fuel 74 has a temperature of approximately 120 degrees before being channeled into combustor 18.

More specifically, based on the input received from temperature sensor 110, computer 122 operates economizer inlet valve 90, economizer bypass valve 92, and fuel heat exchanger bypass valve 94 to enable working fluid 86 to be channeled through heat exchanger 70 to facilitate either increasing or decreasing the operational temperature of fuel 74.

For example, in one embodiment, computer 122 aligns secondary heating system 62 such that economizer inlet valve 90 is at least partially open, economizer bypass valve 92 is closed, and fuel heat exchanger bypass valve 94 is closed. During operation, pump 82 is operated such that working fluid 86, i.e. demineralized water, is channeled from storage tank 84 through economizer 80.

As shown in FIG. 2, and in the exemplary embodiment, economizer 80 is coupled within exhaust 46 such that the working fluid 86 within the secondary heating system 62 will extract the heat remaining in the exhaust gases. discharged through exhaust duct 46 to facilitate increasing the operational temperature of working fluid 86 to a second temperature that is greater than the temperature of working fluid 86 prior to entering economizer 80. In one embodiment, the heated working fluid 86 is then channeled through heat exchanger 70 wherein the heat rejected from working fluid 86 is utilized to increase an operating temperature of fuel 74 within heat exchanger 70. The heated fuel 74 is then channeled to combustor 18 and combusted within gas turbine engine 10.

More specifically, as shown in FIG. 4, working fluid 86 is channeled through economizer 80 at a first temperature, the heat energy is then extracted from the exhaust gases discharged through exhaust duct 46 to facilitate increasing the operational temperature of working fluid 86 to a second temperature that is greater than the temperature of working fluid 86 prior to entering economizer 80. Additionally, the temperature of the operational temperature of the exhaust gases is decreased by transferring the heat energy from the exhaust gases to working fluid 86. Accordingly, channeling working fluid 86 through an economizer 80 that is located within exhaust stack 46 facilitates increasing an operational temperature of working fluid 86 and also facilitates reducing an operational temperature of the exhaust gases discharged through exhaust stack 46.

In one exemplary embodiment, economizer inlet valve 90 is in at least a partially open position, economizer bypass valve 92 is closed, and heat exchanger bypass valve 94 is in a closed position such that heated working fluid 86 discharged from economizer 80 is then channeled through heat exchanger 70 to facilitate increasing the operational temperature of fuel 74 and decreasing an operational temperature of working fluid 86. More specifically, to facilitate maintaining fuel 74 at the preselected temperature, control system 100 monitors the temperature of fuel 74 utilizing temperature sensor 110. As a result, economizer inlet valve 90 is repositioned to either increase or decrease the volume of working fluid 86 that is channeled through economizer 80 and heat exchanger 70 to facilitate maintaining the operational temperature of fuel 74 to the preselected temperature. The working fluid is then channeled from heat exchanger 70 through a check valve 146 and into combustor 18.

Accordingly, as shown in FIG. 5, channeling working fluid 86 through a heat exchanger 70 facilitates reducing the operational temperature of working fluid 86, prior to working fluid 86 being channeled into combustor 18, and also facilitates increasing an operational temperature of the fuel channeled into combustor 18.

In another exemplary embodiment, economizer inlet valve 90 is open, economizer bypass valve 92 is closed, and heat exchanger bypass valve 94 is at least partially open such that a first portion 150 heated working fluid 86 discharged from economizer 80 is channeled through heat exchanger 70 to facilitate increasing the operational temperature of fuel 74 and decreasing an operational temperature of working fluid 86 and a second portion 152 of heated working fluid 86 is channeled through a check valve 154 wherein it is recombined with first portion 150 and channeled into combustor 18. More specifically, to facilitate maintaining fuel 74 at the preselected temperature, control system 100 monitors the temperature of fuel 74 utilizing temperature sensor 110. As a result, heat exchanger bypass valve 94 is repositioned to either increase or decrease the volume of working fluid 86 that is channeled through heat exchanger 70, i.e. by bypassing a portion 152 of the working fluid 86 around heat exchanger 70, to facilitate maintaining the operational temperature of fuel 74 at the preselected temperature.

In another exemplary embodiment, economizer inlet valve 90 is closed, economizer bypass valve 92 is at least partially opened, and heat exchanger bypass valve 94 is closed such that working fluid 86 is discharged from storage tank 84, through check valve 145 and into combustor 18. More specifically, control system 100, based on temperature sensor 100, may configure system 62 to bypass heat exchanger 72 when fuel 74 is currently at the preselected temperature. As a result, heat exchanger bypass valve 94 is repositioned to either increase or decrease the volume of working fluid 86 that is channeled directly to combustor 18 to facilitate reducing nitrous oxide emissions from gas turbine engine 10.

The above-described fuel heating system includes a fuel heating system that is configured to channel de-mineralized water from a storage tank through a pump wherein the demineralized water is split into two streams. One of the streams may be channeled through a high pressure economizer in the exhaust stack of the gas turbine engine, wherein the water is not allowed to boil by keeping the pressure of the water relative high. The water extracts the heat generated by the exhaust gases discharged from the gas turbine engine and channels the heated water to a fuel heat exchanger wherein a bypass valve is utilized to facilitate control the fuel temperature to a desired set point. Additionally, water from the second stream is added back to the stream flowing from the heat exchanger before it is injected into the combustor. Fuel heated in the fuel heat exchanger is also injected into the combustor to burn and provide heat to gases being expanded through the turbine. Accordingly, fuel may be heated in either simple and/or combined cycle gas turbine applications to temperatures as high as 400 degrees Fahrenheit using steam generated in the heat recovery boilers, thus increasing the efficiency of the power plant between 0.25% and approximately 0.5%. as shown in Table 1 below.

TABLE 1

ENGINE PERFORMANCE MODEL

| CASE | Tfuel Deg F. | Power MW | Heat rate BTU/KWH | water flow PPS | Twater Deg F. |
|---|---|---|---|---|---|
| 107 | 77 | 100.22 | 7732.8 | 10.26 | 77 |
| 207 | 180 | 100.17 | 7718.1 | 10.58 | 77 |
| 307 | 365 | 100.08 | 7687.5 | 11.1 | 77 |
| 407 | 77 | 100.18 | 7683.9 | 10.74 | 250 |
| 507 | 180 | 100.13 | 7667.8 | 11.08 | 250 |
| 607 | 365 | 100.04 | 7635.1 | 11.62 | 250 |

As shown in Table 1, heating the fuel and water results in substantial decrease in heat rate of the gas turbine engine. For example, increasing the temperature of the fuel from 77° F. to 250° F. and increasing the temperature of the water from 77° F. to 365° F., the heat rate of the gas turbine engine may be reduced by approximately 98 btu/KWH (British Thermal Unit/Kilo watt Hour) or approximately 1.26%, resulting in a savings of approximately $400,000 reduction in yearly fuel cost for a gas turbine operating approximately 8000 hours per year.

The fuel heating system described herein also includes a control system that is utilized to sense the temperature of the heated fuel and provide control signals to various valves to facilitate controlling both the temperature of heated water and the fuel being injected into the combustor.

Exemplary embodiments of a fuel heating system are described above in detail. The fuel heating system is not limited to the specific embodiments described herein, but rather, components of the system may be utilized independently and separately from other components described herein. Specifically, the fuel heating system described herein may be utilized on any known gas turbine engine.

While the invention has been described in terms of various specific embodiments, those skilled in the art will recognize that the invention can be practiced with modification within the spirit arid scope of the claims.

What is claimed is:

1. A method for operating a gas turbine engine including a compressor, a combustor, and a turbine, coupled together in serial flow arrangement, and a fuel heating system including a heat exchanger and an economizer, said method comprising:
   channeling fuel though the heat exchanger;
   channeling a flow of working fluid though the heat exchanger to facilitate regulating the operating temperature of the fuel and the operating temperature of the working fluid;
   regulating the flow of working fluid through the economizer to facilitate regulating an operating temperature of the fuel channeled though the heat exchanger; and
   channeling the fuel and the working fluid into the gas turbine engine combustor to facilitate increasing a fuel efficiency of the gas turbine engine.

2. A method in accordance with claim 1 further comprising:
   channeling the working fluid though the economizer; and
   extracting energy from exhaust gases channeled around the economizer to facilitate increasing an operating temperature of the working fluid.

3. A method in accordance with claim 1 wherein the working fluid is demineralized water, said method further comprising channeling the demineralized water into the gas turbine engine combustor to facilitate reducing nitrous oxide emissions generated by the gas turbine engine.

4. A method in accordance with claim 1 further comprising regulating the flow of working fluid through the heat exchanger to facilitate regulating an operating temperature of the fuel channeled through the heat exchanger.

5. A method in accordance with claim 4 wherein regulating the flow of the working fluid flowing through the heat exchanger comprises operating a heat exchanger bypass valve to facilitate regulating the flow of working fluid channeled through the heat exchanger.

6. A method in accordance with claim 1 wherein the fuel heating system includes a fuel temperature sensor and a control system coupled to the fuel temperature sensor, the method further comprises operating a heat exchanger bypass valve to regulate the flow of working fluid channeled through the heat exchanger based on the input received from the fuel temperature sensor.

7. A fuel heating system for a gas turbine engine including at least a combustor and a turbine, said fuel heating system comprising:
- a heat exchanger comprising a fuel circuit having fuel flowing therethrough and a working fluid circuit having a working fluid flowing therethrough to regulate the operating temperature of the fuel flowing through the fuel circuit, said heat exchanger configured to discharge fuel from said fuel circuit into the combustor, and to discharge the working fluid from said working fluid circuit to the combustor to facilitate increasing the fuel efficiency of the gas turbine engine; and
- an economizer coupled in flow communication with said heat exchanger working fluid circuit, said economizer configured to extract energy from gas turbine engine exhaust gases to facilitate increasing an operating temperature of the working fluid channeled therethrough.

8. A fuel heating system in accordance with claim 7 wherein said working fluid comprises demineralized water, said working fluid circuit configured to channel demineralized water into the gas turbine engine combustor to facilitate reducing nitrous oxide emissions generated by the gas turbine engine.

9. A fuel heating system in accordance with claim 7 further comprising a first valve to regulate the flow of working fluid channeled though said economizer and said heat exchanger working fluid circuit.

10. A fuel heating system in accordance with claim 9 further comprising a second valve to regulate the flow of working fluid bypassed around said heat exchanger working fluid circuit.

11. A fuel heating circuit in accordance with claim 10 further comprising:
- a fuel temperature sensor configured to sense the temperature of the fuel channeled from said fuel circuit to the combustor; and
- a control system coupled to said fuel temperature sensor, said control system configured to operate said second valve to regulate the flow of working fluid channeled through said working fluid circuit based on an input received from said fuel temperature sensor.

12. A fuel heating system in accordance with claim 11 wherein said control system is configured to operate said first and second valves to regulate the flow of working fluid channeled though said working fluid circuit based on a preselected fuel temperature.

13. A gas turbine engine assembly comprising:
a compressor;
a combustor downstream from said compressor;
a turbine coupled in flow communication with said combustor; and
a fuel heating system comprising
- a heat exchanger comprising a fuel circuit having fuel flowing therethrough and a working fluid circuit having a working fluid flowing therethrough to regulate the operating temperature of the fuel flowing through the fuel circuit, said heat exchanger configured to discharge fuel from said fuel circuit into the combustor, and to discharge the working fluid from said working fluid circuit to the combustor to facilitate increasing the fuel efficiency of the gas turbine engine; and
- an economizer coupled in flow communication with said heat exchanger working fluid circuit, said economizer configured to extract energy from gas turbine engine exhaust gases to facilitate increasing an operating temperature of the working fluid channeled therethrough.

14. A gas turbine engine assembly in accordance with claim 13 wherein said working fluid comprises demineralized water, said working fluid circuit configured to channel demineralized water into the gas turbine engine combustor to facilitate reducing nitrous oxide emissions generated by the gas turbine engine.

15. A gas turbine engine assembly in accordance with claim 13 further comprising a first valve to regulate the flow of working fluid channeled through said economizer and said heat exchanger working fluid circuit.

16. A gas turbine engine assembly in accordance with claim 15 further comprising a second valve to regulate the flow of working fluid bypassed around said heat exchanger working fluid circuit.

17. A gas turbine engine assembly in accordance with claim 16 further comprising:
- a fuel temperature sensor configured to sense the temperature of the fuel channeled from said fuel circuit to the combustor; and
- a control system coupled to said fuel temperature sensor, said control system configured to operate said first and second valves to regulate the flow of working fluid channeled through said working fluid circuit based on a preselected fuel temperature.

* * * * *